United States Patent
Mejdrich et al.

(10) Patent No.: US 9,075,623 B2
(45) Date of Patent: Jul. 7, 2015

(54) EXTERNAL AUXILIARY EXECUTION UNIT INTERFACE FOR FORMAT CONVERSION OF INSTRUCTION FROM ISSUE UNIT TO OFF-CHIP AUXILIARY EXECUTION UNIT

(75) Inventors: Eric O. Mejdrich, Preston, WA (US); Paul E. Schardt, Rochester, MN (US); Robert A. Shearer, Rochester, MN (US); Corey V. Swenson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 13/352,907

(22) Filed: Jan. 18, 2012

(65) Prior Publication Data
US 2013/0185542 A1 Jul. 18, 2013

(51) Int. Cl.
*G06F 9/38* (2006.01)
*G06F 15/80* (2006.01)
*G06F 15/78* (2006.01)

(52) U.S. Cl.
CPC ............ *G06F 9/3881* (2013.01); *G06F 9/3877* (2013.01); *G06F 15/8038* (2013.01); *G06F 15/7864* (2013.01)

(58) Field of Classification Search
CPC ... G06F 9/3836; G06F 9/3885; G06F 9/3877; G06F 9/3879; G06F 9/3881; G06F 15/16; G06F 15/163; G06F 15/17
USPC ........... 712/E9.049, E9.071, E9.066, E9.067, 712/E9.068, E9.069, 214, 34, 28, 29, 30, 712/31, 38
See application file for complete search history.

(56) References Cited

U.S. PATENT DOCUMENTS

| | | | |
|---|---|---|---|
| 5,574,849 A * | 11/1996 | Sonnier et al. ................... | 714/12 |
| 6,754,804 B1 * | 6/2004 | Hudepohl et al. .............. | 712/34 |
| 7,062,724 B2 | 6/2006 | Nakajima | |
| 7,469,350 B2 * | 12/2008 | Henderson et al. ........... | 713/300 |
| 7,512,724 B1 * | 3/2009 | Dennis et al. ................... | 710/45 |
| 7,647,475 B2 * | 1/2010 | Svendsen et al. .............. | 712/34 |
| 7,930,519 B2 * | 4/2011 | Frank .............................. | 712/34 |
| 2006/0010305 A1 | 1/2006 | Maeda et al. | |

FOREIGN PATENT DOCUMENTS

| | | |
|---|---|---|
| EP | 0646876 A1 | 4/1995 |
| WO | 9316433 A1 | 8/1993 |
| WO | 9531778 A1 | 11/1995 |

OTHER PUBLICATIONS

International Search Report and Written Opinion of the ISA dated May 14, 2013—International Application No. PCT/IB2012/057453.

* cited by examiner

*Primary Examiner* — Kenneth Kim
(74) *Attorney, Agent, or Firm* — Wood, Herron & Evans, LLP

(57) ABSTRACT

An external Auxiliary Execution Unit (AXU) interface is provided between a processing core disposed in a first programmable chip and an off-chip AXU disposed in a second programmable chip to integrate the AXU with an issue unit, a fixed point execution unit, and optionally other functional units in the processing core. The external AXU interface enables the issue unit to issue instructions to the AXU in much the same manner as the issue unit would be able to issue instructions to an AXU that was disposed on the same chip. By doing so, the AXU on the second programmable chip can be designed, tested and verified independent of the processing core on the first programmable chip, thereby enabling a common processing core, which has been designed, tested, and verified, to be used in connection with multiple different AXU designs.

19 Claims, 8 Drawing Sheets

EXTERNAL AUXILIARY EXECUTION UNIT INTERFACE FOR FORMAT CONVERSION OF INSTRUCTION FROM ISSUE UNIT TO OFF-CHIP AUXILIARY EXECUTION UNIT

FIELD OF THE INVENTION

The invention is generally related to data processing, and in particular to processor architectures and execution units incorporated therein.

BACKGROUND OF THE INVENTION

Computers and other programmable electronic devices continue to be integrated into every aspect of society. Whereas computers once occupied entire rooms, computers and the integrated circuit devices, or chips, that power such computers have now been miniaturized and commoditized to such an extent that they can be found in even the most mundane of products and devices.

Programmable chips such as microprocessors, microcontrollers, Application Specific Integrated Circuits (ASIC's) and the like continue to increase in complexity and power while costs, power consumption and feature sizes decrease. Whereas computers once incorporate separate chips for processors, graphics controllers, coprocessors, memory controllers, and other chipset logic, oftentimes all of these types of functional units are integrated into a single programmable chip. Moreover, once a particular chip design has been developed, tested and verified, manufacturing costs are often comparatively low on a per unit basis.

A significant portion of the effort and expense associated with bringing a programmable chip to market are therefore devoted to the initial design, testing and verification of a programmable chip. For this reason, design reuse is employed whenever possible so that portions of a programmable chip, such as particular processor core designs, functional units, and other logic blocks, which have previously been designed, tested and verified, do not need to be recreated from scratch.

Even with design reuse, however, the integration of multiple design components into a common design frequently requires some custom logic to be designed and tested to ensure that the components will correctly operate with one another once integrated onto the same programmable chip. For example, modern microprocessors typically include functional units such as issue or instruction units, load/store units, execution units, memory controllers, graphics controllers, cache and other on-board memories, etc., and development of such microprocessors often requires substantial development, testing and verification efforts to ensure that all of the functional units operate in an intended manner.

Furthermore, many microprocessor designs rely on a basic design that can be extended through the use of different functional units to provide various designs that are optimized for different applications. For example, it may be desirable to extend the functionality of a microprocessor by integrating multiple processing cores together to facilitate parallel processing, as well as integrating various execution units within a processing core to optimize the core to handle certain types of workloads. For example, while a basic microprocessor design often includes a processing core with an issue or instruction unit that issues instructions to an execution unit referred to as a fixed point unit, integer unit or arithmetic logic unit that handles integer operations, additional execution units, e.g., floating point execution units, graphics engines, physics engines, encryption engines, and the like may be incorporated into the basic design to provide an application specific design that is optimized for certain applications.

With the ability to combine different types of execution units in various processing cores and programmable chips, significant design flexibility is provided for developing application-specific hardware. On the other hand, given the substantial up-front efforts still required to design, test and verify multiple functional units integrated into application-specific programmable chips, there are still substantial costs associated with bringing application-specific programmable chips to market.

Another concern that has arisen with respect to the development of programmable chips is the integration of functional units designed, developed or otherwise the property of different entities. Customers often rely on other entities to design their programmable chips, and often designs that are proprietary to both the entities that design the programmable chips and the customers are integrated together on the same programmable chips, often leading to licensing issues as well as concerns about maintaining the confidential nature of some designs.

Therefore, a significant need continues to exist in the art for a manner of facilitating the development of application-specific programmable chips and electronic devices incorporating the same.

SUMMARY OF THE INVENTION

The invention addresses these and other problems associated with the prior art by providing a method, apparatus, and program product that utilize an external Auxiliary Execution Unit (AXU) interface between a processing core disposed in a first programmable chip and an off-chip AXU disposed in a second programmable chip. The AXU interface integrates an AXU with a processing core that includes at least an issue unit and a fixed point execution unit, and enables the issue unit to issue instructions to the AXU in much the same manner as the issue unit would be able to issue instructions to an AXU that was disposed on the same chip. By doing so, the AXU on the second programmable chip can be designed, tested and verified independent of the processing core on the first programmable chip, thereby enabling a common processing core, which has been designed, tested, and verified, to be used in connection with multiple different AXU designs.

Consistent with one aspect of the invention, an integrated circuit chip includes a processing core with an issue unit and a fixed point execution unit, where the issue unit is configured to issue instructions to the fixed point execution unit for execution thereby. In addition, external auxiliary execution unit (AXU) interface logic, disposed on the integrated circuit chip and coupled to the issue unit, is configured to receive instructions issued by the issue unit and communicate the instructions over an external AXU interface to an off-chip AXU for execution thereby.

Consistent with another aspect of the invention, an integrated circuit chip includes an off-chip auxiliary execution unit (AXU) and external AXU interface logic configured to couple the off-chip AXU to a processing core disposed on a different chip and including a fixed point execution unit and an issue unit configured to issue instructions to the fixed point execution unit for execution thereby. The external AXU interface logic is configured to receive instructions issued by the issue unit over an external AXU interface and communicate the instructions to the off-chip AXU for execution thereby.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
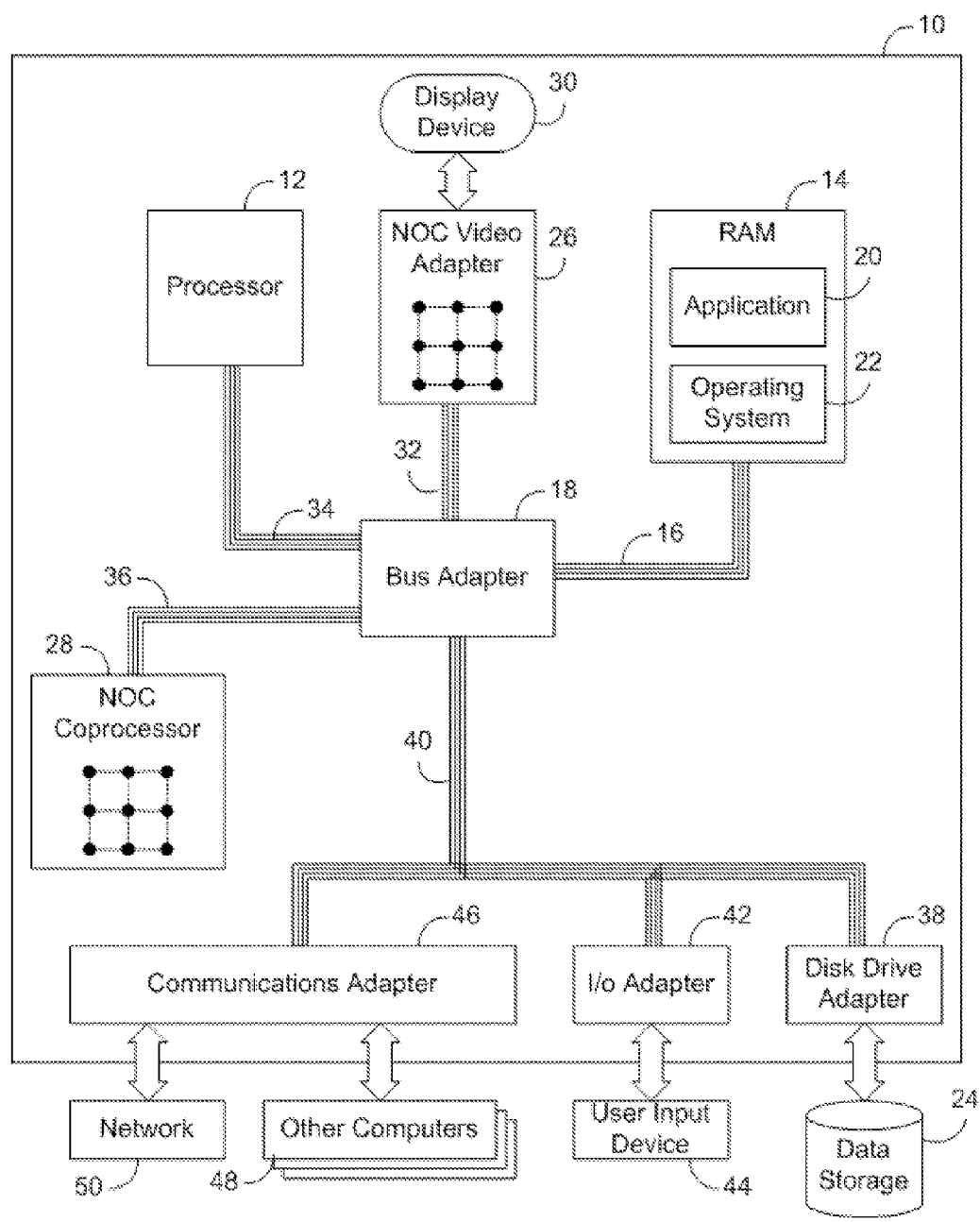
FIG. 1 is a block diagram of exemplary automated computing machinery including an exemplary computer useful in data processing consistent with embodiments of the present invention.

Embodiments consistent with the invention utilize an external Auxiliary Execution Unit (AXU) interface between a processing core disposed in a first programmable chip and an off-chip AXU disposed in a second programmable chip to integrate the AXU with an issue unit, a fixed point execution unit, and optionally other functional units in the processing core. The external AXU interface enables the issue unit to issue instructions to the AXU in much the same manner as the issue unit would be able to issue instructions to an AXU that was disposed on the same chip. By doing so, the AXU on the second programmable chip can be designed, tested and verified independent of the processing core on the first programmable chip, thereby enabling a common processing core, which has been designed, tested, and verified, to be used in connection with multiple different AXU designs.

An AXU consistent with the invention may incorporate various types of functionality that extends, accelerates or otherwise improves the performance of the processing core for a desired application. For example, an AXU may be implemented as a floating point unit (FPU), a compression engine, a graphics engine, an encryption engine, a physics engine, a regular expression engine, a digital signal processor (DSP), a packet processor, proprietary designs and/or a combination of the same. The AXU is disposed in a separate chip from the processing core, and may be implemented using any of a number of different hardware designs, including, for example, an Application Specific Integrated Circuit (ASIC), Field Programmable Gate Array (FPGA), a chip stack, custom logic, discrete components, sensor, etc.

An external AXU interface interconnects the off-chip AXU with the processing core, allowing communication between the issue unit in the processing core, and optionally, additional functional units within the processing core, e.g., a fixed point execution unit, a memory management unit, cache units, on-chip accelerators, floating point units, external I/O (e.g., PCIe, USB, SATA), etc., thereby enabling the AXU to utilize the functional units in the processing core and to be tightly integrated with the processing core. The AXU interface is configured to stream instructions from the instruction unit to the off-chip AXU, as well as to communicate architectural state information between the processing core and the off-chip AXU, thereby maintaining a consistent overall architectural state. However, an external AXU interface consistent with the invention may communicate additional information between a processing core and an external AXU, including, for example, load and store data, reset/flush commands, response/completion messages, etc.

An external AXU interface consistent with the invention may also, in some embodiments, incorporate translation logic configured to interface between a high speed domain as is typical in a processing core and a lower speed communications link between the processing core and the off-chip AXU. For example, an external AXU interface may incorporate a protocol that supports an infinite or indeterminate latency. An external AXU interface may also include step down/step up logic to interface between a high frequency domain in the processing core and a lower frequency domain on the chip-to-chip interface, and may include serializer and/or packetizer logic to convert to a serial-based and/or packet-based format over the chip-to-chip interface, and an external AXU interface may support a variable bus width such that different widths may be used in different applications.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
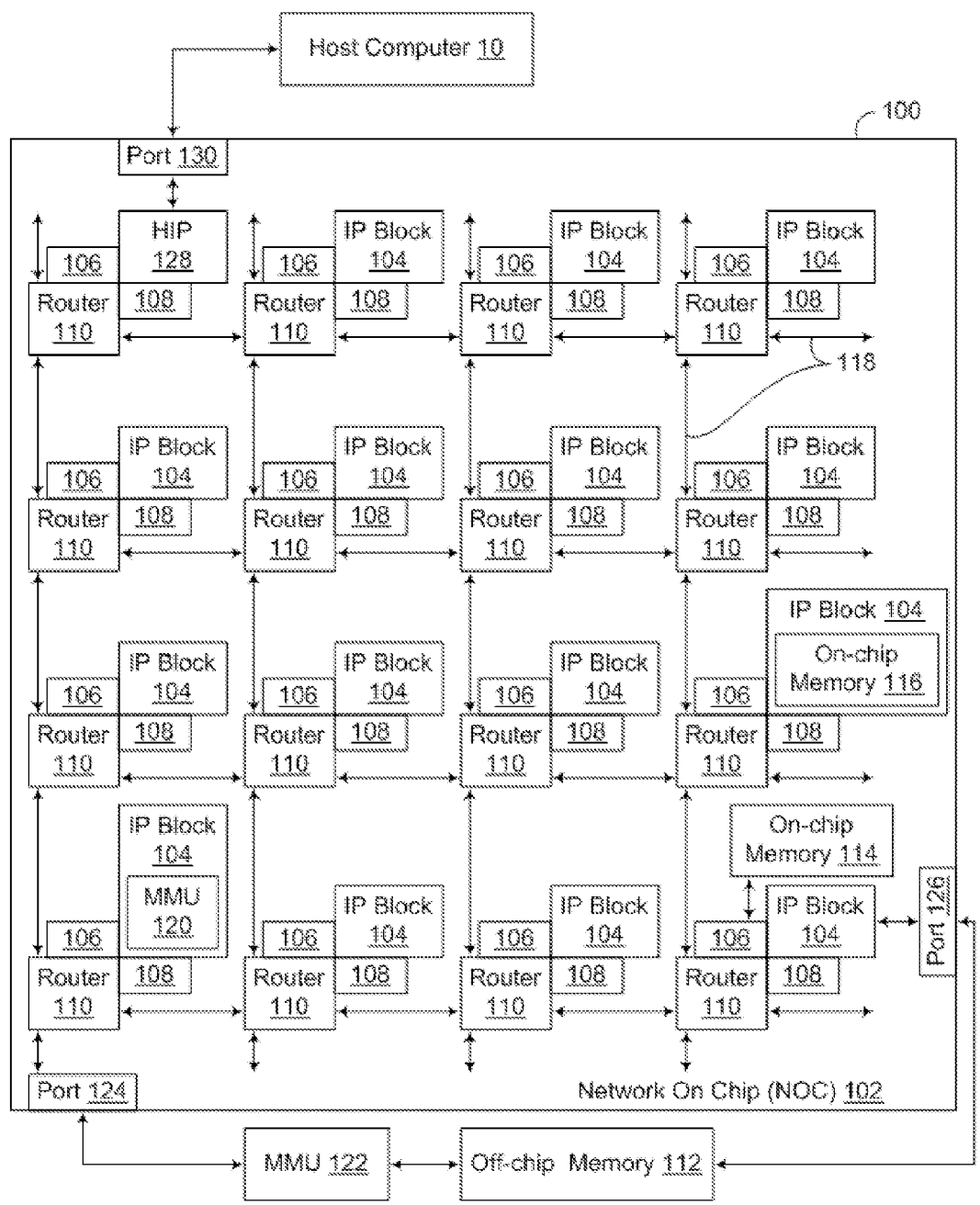
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
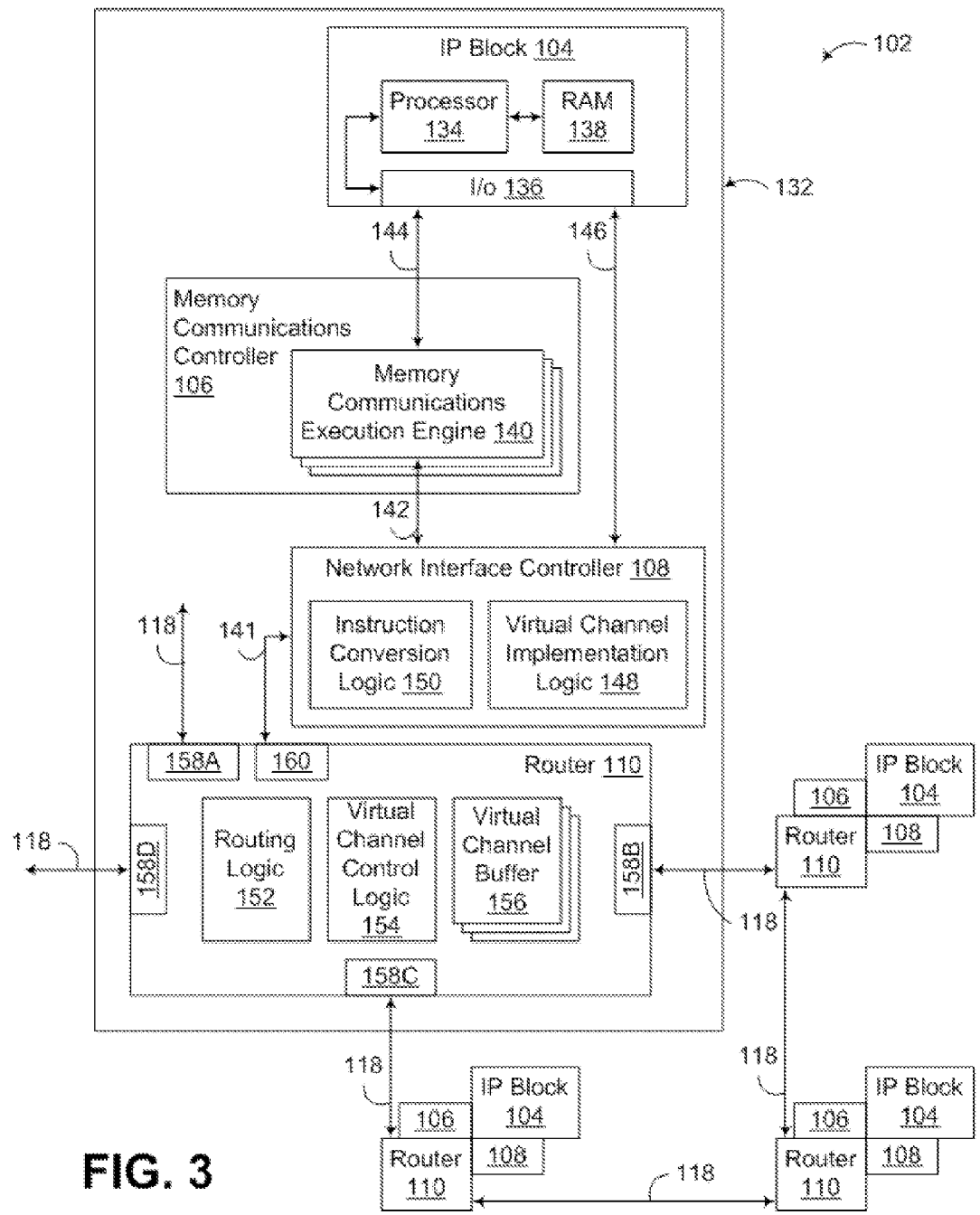
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
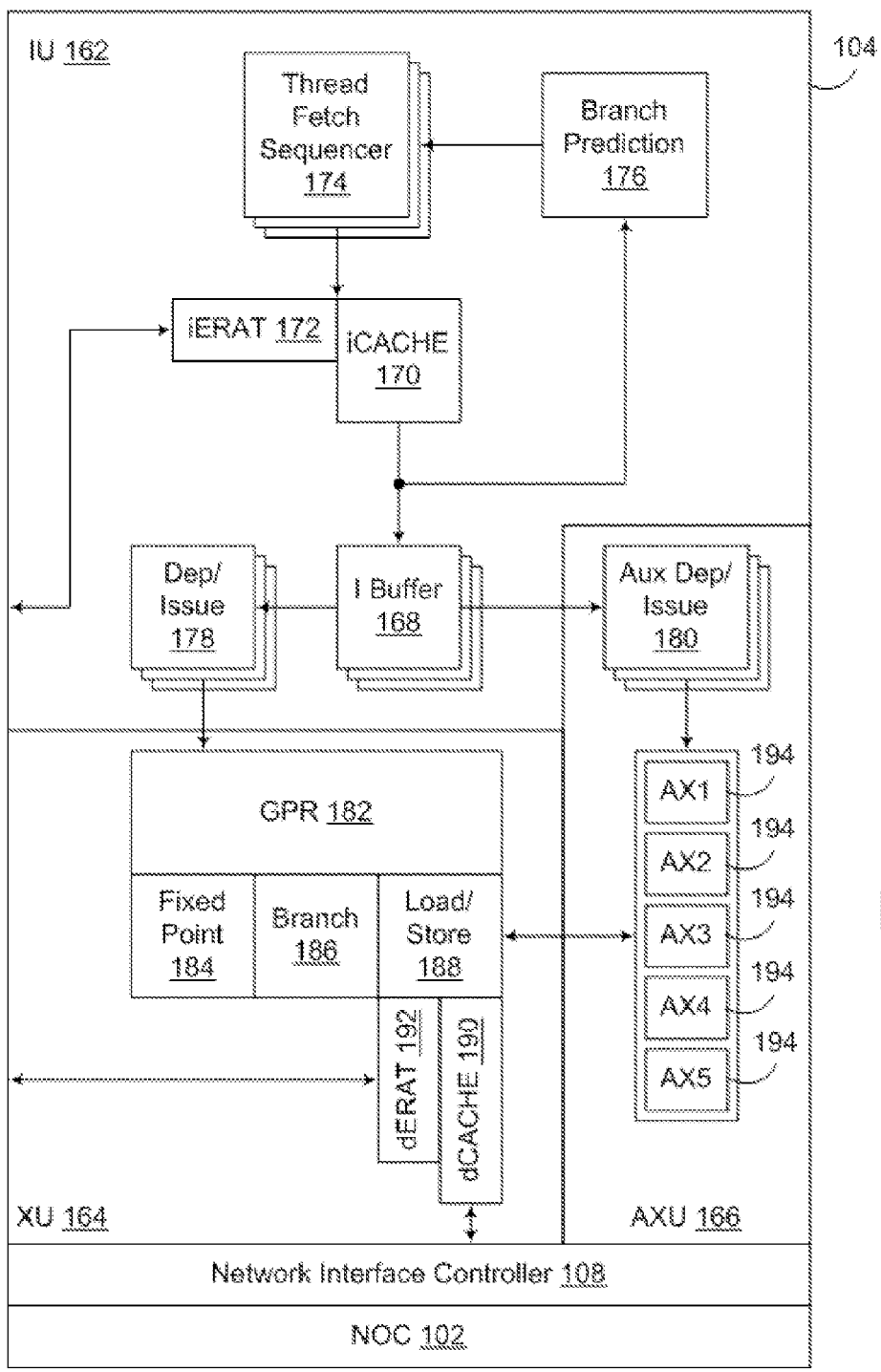
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

External AXU Interface for Off-Chip AXU

Figure 5:
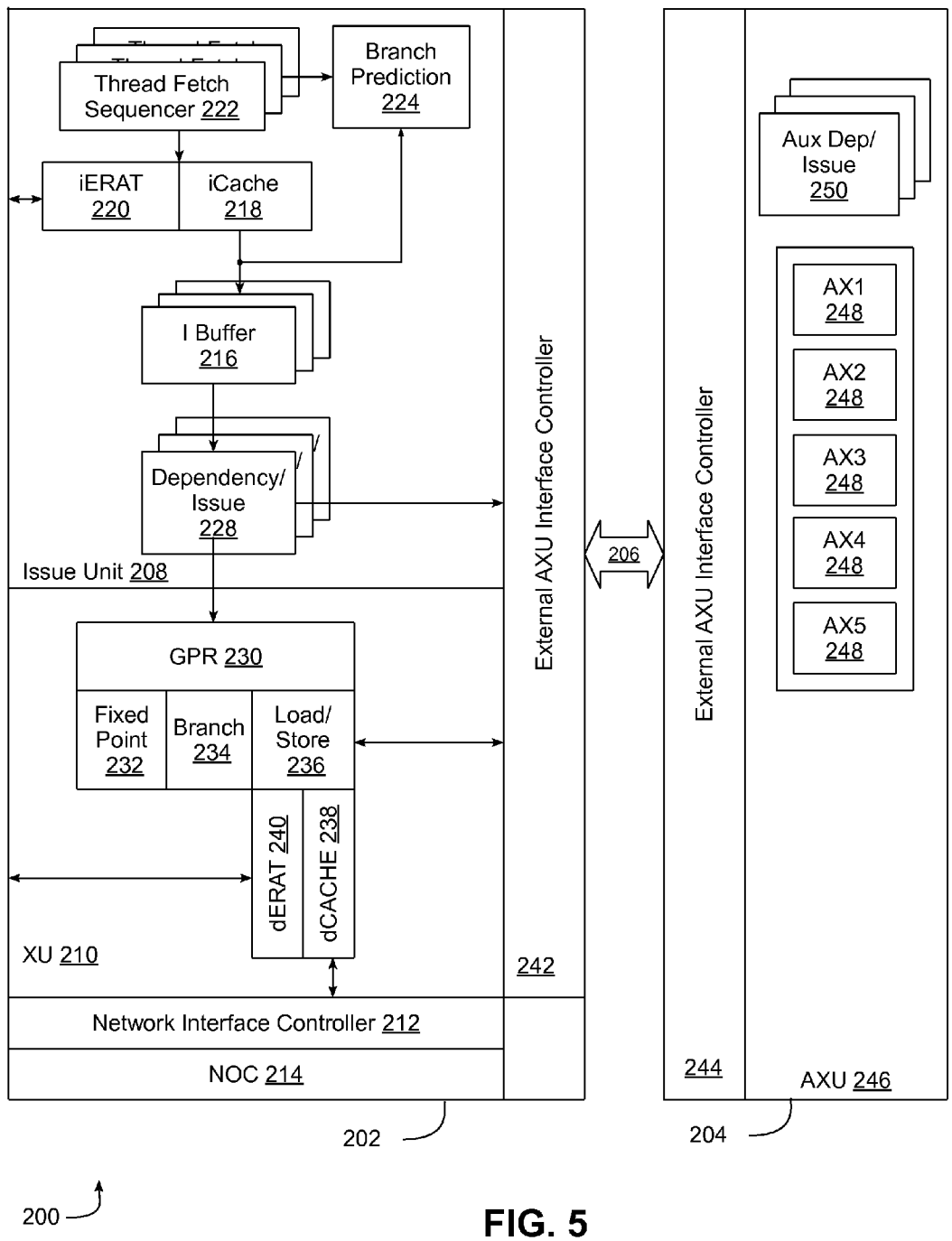
FIG. 5 is a block diagram of an IP block from the NOC of FIG. 2, and incorporating an external auxiliary execution unit (AXU) interface with an off-chip AXU consistent with the invention.

Turning now to FIG. 5, this figure illustrates an exemplary data processing system that implements an external auxiliary execution unit (AXU) interface consistent with the invention. In particular, another exemplary implementation of an IP block 200 incorporates an on-chip processing element 202 coupled to an off-chip AXU 204 over an external AXU interface 206.

Processing element 202, which is similar to the processing element in IP block 104 of FIG. 4, includes an instruction unit (IU) 208, execution unit (XU) 210, and Network Interface Controller (NIC) 212, and is coupled to a NOC 214.

In the illustrated implementation, IU 208 includes a plurality of instruction buffers 216 that receive instructions from an L1 instruction cache (iCACHE) 218. Each instruction buffer 216 is dedicated to one of a plurality, e.g., four, symmetric multithreaded (SMT) hardware threads. An effective-to-real translation unit (iERAT) 220 is coupled to iCACHE 218, and is used to translate instruction fetch requests from a plurality of thread fetch sequencers 222 into real addresses for retrieval of instructions from lower order memory. Each thread fetch sequencer 222 is dedicated to a particular hardware thread, and is used to ensure that instructions to be executed by the associated thread is fetched into the iCACHE for dispatch to the appropriate execution unit. As also shown in FIG. 5, instructions fetched into instruction buffer 216 may also be monitored by branch prediction logic 224, which provides hints to each thread fetch sequencer 222 to minimize instruction cache misses resulting from branches in executing threads. IU 208 also includes a dependency/issue logic block 228 dedicated to each hardware thread, and configured to resolve dependencies and control the issue of instructions from instruction buffer 216 to XU 210.

XU 210 is implemented as a fixed point execution unit, including a set of general purpose registers (GPR's) 230 coupled to fixed point logic 232, branch logic 234 and load/store logic 236. Load/store logic 236 is coupled to an L1 data cache (dCACHE) 238, with effective to real translation provided by dERAT logic 240. XU 164 may be configured to implement practically any instruction set, e.g., all or a portion of a 32 b or 64 b PowerPC instruction set.

To provide access to an AXU over external AXU interface 206, an external AXU interface controller 242 is disposed in IP block 200, and a complementary external AXU interface controller 244 is disposed in external chip 204, and interfaced with an external AXU 246. External AXU 246 operates as an auxiliary execution unit including one or more execution blocks 248. AXU 246 may include any number of execution blocks, and may implement practically any type of execution unit, e.g., a floating point unit, or one or more specialized execution units such as encryption/decryption units, coprocessors, vector processing units, graphics processing units, XML processing units, etc.

As with IP block 104 of FIG. 4, separate dependency/issue logic 250 may optionally be provided for external AXU 246, whether within external AXU 246 (as shown) or within issue unit 208. Alternatively, as illustrated in FIG. 5, dependency/issue logic 228 may handle the issuance of instructions to external AXU 246. An AXU-specific dependency/issue logic 250 may be used, for example, to support dedicated microcode or sequencer logic in an AXU.

In the illustrated embodiment, external AXU interface 206 is implemented as a high speed auxiliary interface to IU 208 and XU 210, e.g., to support both the issuance of instructions to external AXU 246 by IU 208 and direct moves between AXU architected state and XU architected state. In addition, as will become more apparent below, external AXU 246 may leverage much of the functionality disposed in IP block 200 despite being disposed on a separate integrated circuit device, or chip.

Figure 6:
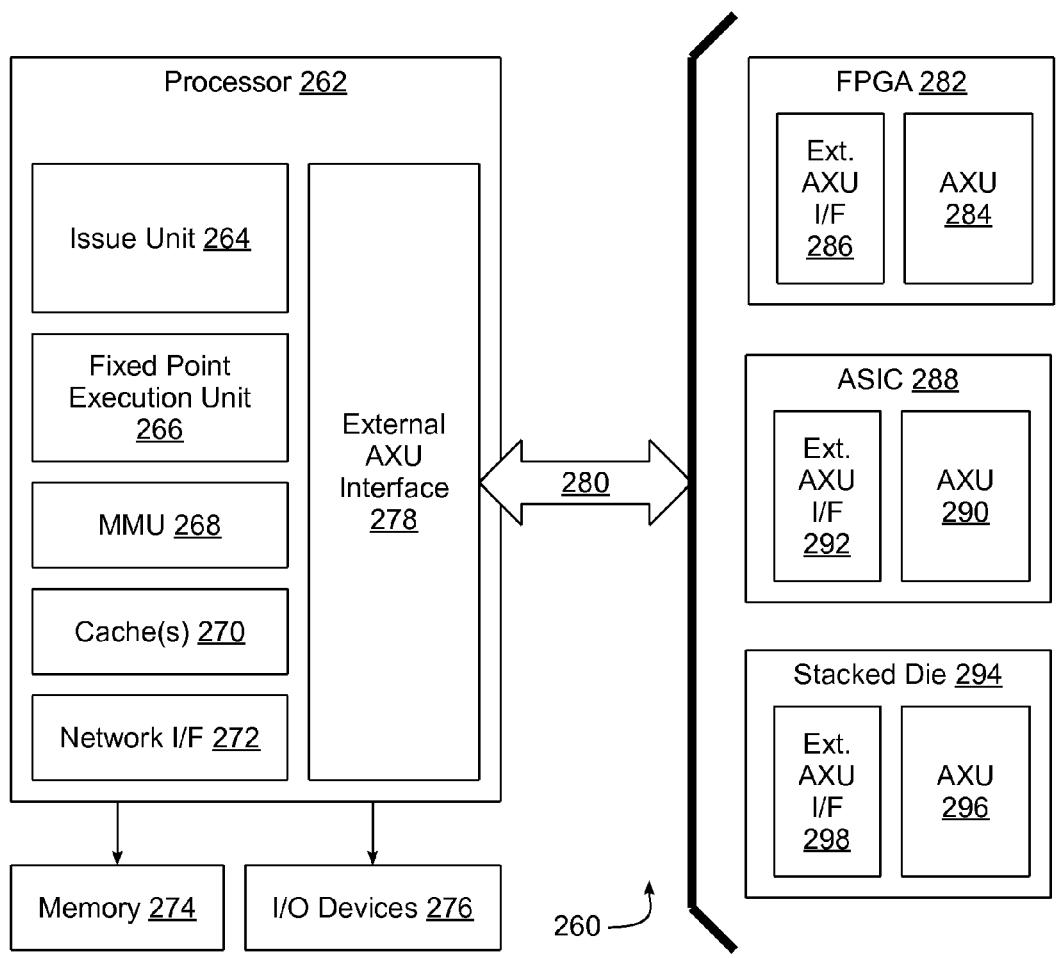
FIG. 6 is a block diagram of another exemplary data processing system incorporating an external AXU interface consistent with the invention.

FIG. 6 illustrates another data processing system 260 incorporating a processor chip 262 with an issue unit 264, fixed point execution unit 266, memory management unit 268, one or more levels of cache 270, a network interface 272, and coupled to an external memory 274 and one or more I/O devices 276, e.g., as connected over a peripheral bus. Processor chip 262 also includes an external AXU interface controller 278 coupled to an external AXU interface 280 consistent with the invention, permitting the processor chip to be interfaced with AXU implemented using a number of different technologies, e.g., an FPGA 282 (with AXU 284 and external AXU interface 286), ASIC 288 (with AXU 290 and external AXU interface 292), or stacked die 294 (with AXU 296 and external AXU interface 298). It will be appreciated that an external AXU interface consistent with the invention may be used to interface with AXU's implemented in other hardware technologies, and thus the invention is not limited to the particular hardware technologies disclosed herein.

Figure 7:
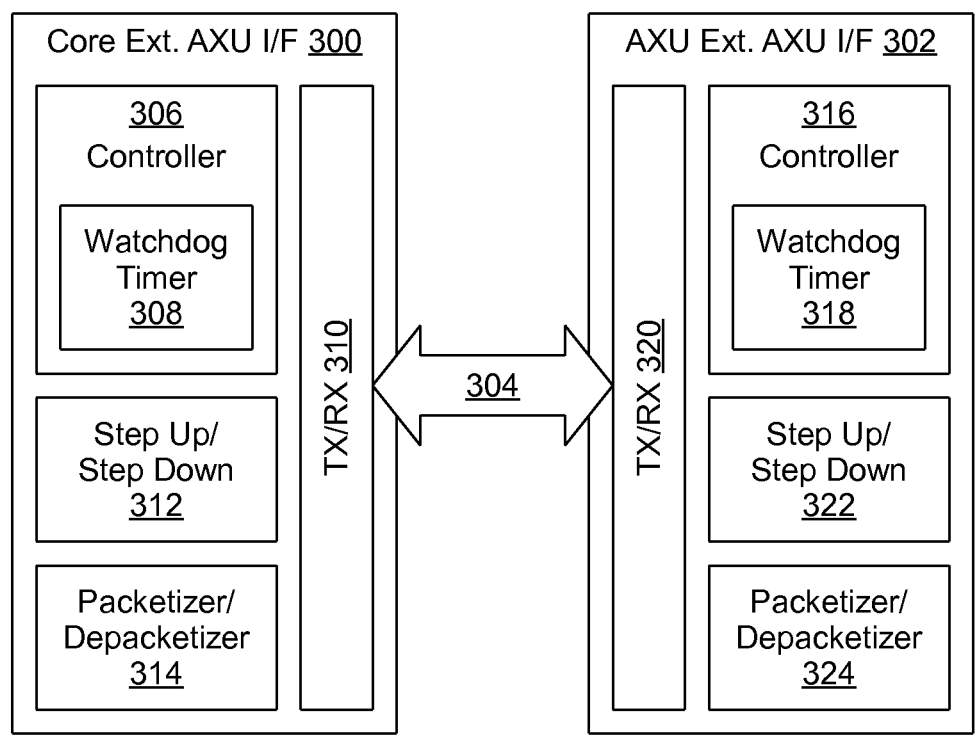
FIG. 7 is a block diagram of an exemplary implementation of the external AXU interface referenced in FIG. 6.

An external AXU interface may be implemented in a number of different manners consistent with the invention. For example, as illustrated in FIG. 7, an external AXU interface may include core external AXU interface logic 300 and AXU external AXU interface logic 302 coupled to one another via a physical interface 304. Core logic 300 includes control logic, e.g., a controller 306, which coordinates the communication over the interface from the perspective of the core. As noted above, an external AXU interface consistent with the invention desirably supports infinite or indeterminate latency, and as such, may require the use of a watchdog timer 308 or like logic to prevent the core from hanging while waiting for a response from an off-chip AXU. In addition, the core logic typically includes transmission/reception logic 310 to handle the physical layer communication over the interface.

As also noted above, an external AXU interface may be required to translate communications to and from the processing core, and as such, may include logic that facilitates such translation. For example, in embodiments where the external AXU interface communicates at a lower frequency than the operating frequency of the core, step up/step down logic 312 may be provided. Step down logic, for example, may be used to reduce a communication frequency of the external AXU interface relative to that of the processing core.

To support packetized interfaces, packetizer/depacketizer logic 314 may be provided. Additional logic, each serializer/deserializer logic may be used to translate between serial and parallel protocols. Furthermore, in some embodiments the interface may support a variable width, and be configurable to utilize only a portion of the architected communication links for an interface. For example, in one exemplary embodiment, an external AXU interface may support up to 32 byte wide data path, with selected implementations being programmable or configurable to use only a portion of the available data path.

Likewise, the AXU external AXU interface logic 304 may include a controller 316 with watchdog timer 318, transmission/reception logic 320, step up/step down logic 322 and packetizer/depacketizer logic 324 complementary to the logic in core logic 302. In some embodiments, controller 316 may be a slave to a master controller 306, while in other embodiments, controller 316 may be omitted. In addition, no watchdog timer 318 may be required in some embodiments.

Figure 8:
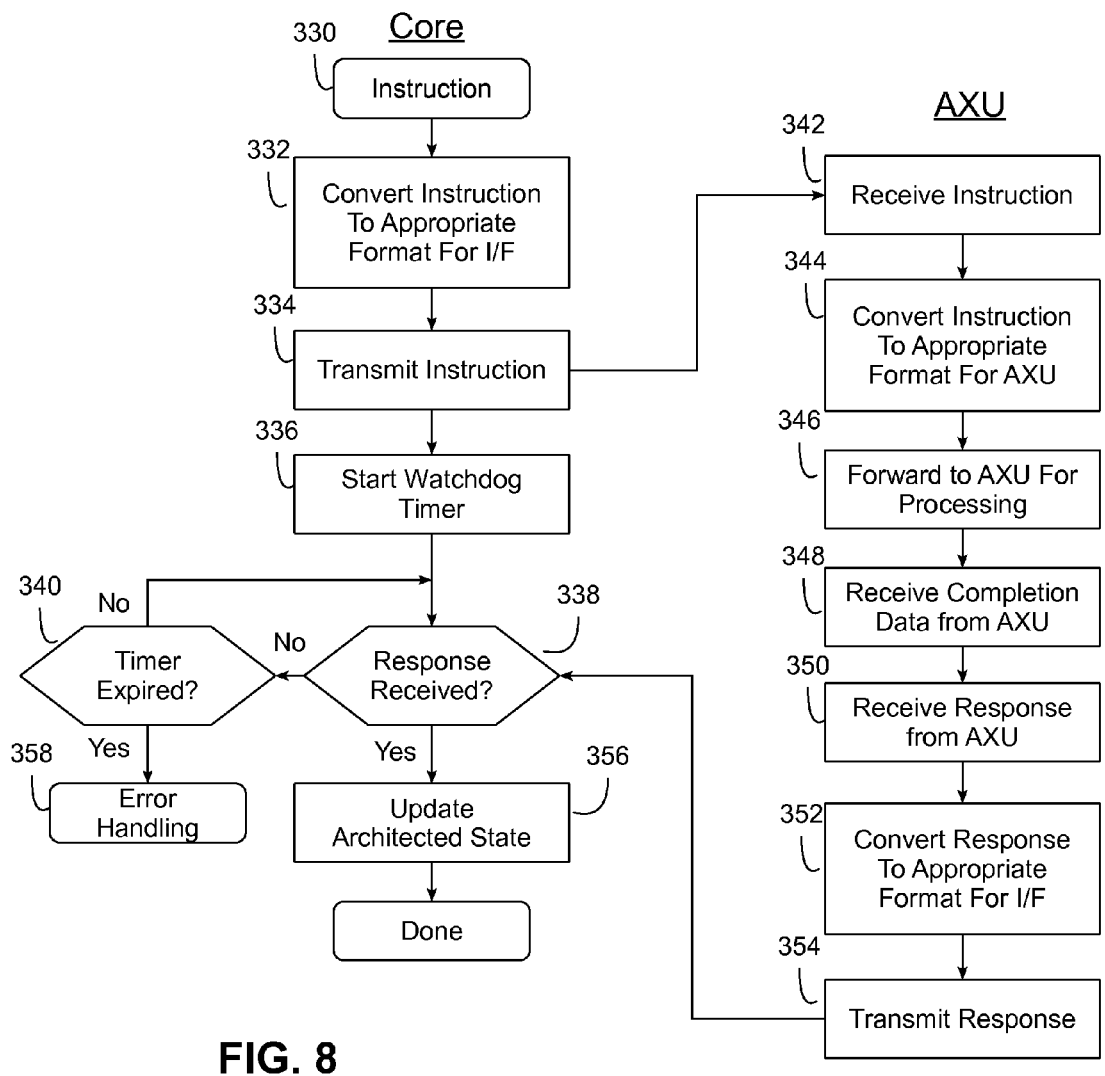
FIG. 8 is a flowchart illustrating an exemplary sequence of operations performed by the external AXU interface of FIG. 6 when communicating an instruction to an off-chip AXU.

As noted above, a primarily classification of data that is communicated over an external AXU interface is an instruction stream including instructions for execution by an off-chip AXU. Instruction blocking and dependencies are typically managed by dependency/issue logic 228 (FIG. 5), and upon the issuance of an instruction to an off-chip AXU by logic 228, a sequence of operations, e.g., as illustrated at 330 in FIG. 8, may be used. In particular, in response to receiving an instruction, the core logic for the interface may convert the instruction to an appropriate format for the interface (block 332), e.g., by converting to a packet, serializing, stepping down to a lower clock frequency, etc. Next, the instruction is transmitted over the interface (block 334), and a watchdog timer is started (block 336). The core logic then enters a loop to wait for a response, checking periodically whether a response has been received (block 338) and whether the watchdog timer has expired (block 340). If an appropriate response is received, block 338 passes control to block 356 to update the architected state for the processing core. On the other hand, if the watchdog timer expires prior to receiving a response, block 340 passes control to block 358 to perform any requisite error handling, e.g., by resetting the off-chip AXU.

Turning to the AXU side of the interface, the instruction transmitted by the core logic in block 334 is received by the AXU logic (block 342), and is converted to an appropriate format for the AXU (block 344). The instruction is then forwarded to the AXU for processing (block 346). Thereafter, completion data from the AXU, e.g., changes to the architected state, e.g., updates to one or more registers, is received by the AXU interface logic (block 348), as well as an appropriate response to be returned to the core (block 350), e.g., success, failure, an error condition, debug or status data, etc. The response is then converted to an appropriate format for the interface (block 352), and transmitted back to the core logic (block 354).

It will be appreciated that other data may be communicated over an external AXU interface. For example, register updates, register/memory transfers (loads/stores), state updates, debug data, performance statistics, instructions, branch redirections, memory management information, etc. may also be communicated over an external AXU interface consistent with the invention. It will also be appreciated that implementation of such an interface would be well within the abilities of one of ordinary skill in the art having the benefit of the instant disclosure. For example, an external AXU interface consistent with the invention may be implemented utilizing a similar protocol to that supported by the on-chip AXU interfaces supported in the PowerPC A2 processors available from International Business Machines.

An external AXU interface consistent with the invention provides a number of benefits, particularly in the development of application specific hardware designs. By providing an external AXU interface on a programmable chip incorporating a processing core, the processing core may be designed, verified and tested, and may operate at a typical microprocessor clock frequency. The processing core may be configured for general purpose computing, and provide standard functional units suitable for a wide variety of applications. An off-chip AXU, providing specialized functionality, may be integrated with the processing core over the external AXU interface, and thereby customize the processing core for a particular application.

One benefit of such a configuration is that different parties can combine their respective intellectual property without the need to disclose such intellectual property to one another. A party wishing to incorporate their own proprietary accelerator functionality, for example, could rely on another party's processing core for the remainder of the required functionality, and thereby limit their custom design, testing and verification to the AXU, often saving considerable cost and effort associated with development of an application specific hardware design. In addition, if one party needs to limit access to their confidential intellectual property, e.g., due to its proprietary nature, or due to government confidential or classified designs, that party may do so without having to disclose such confidential information to the other party.

Furthermore, by providing an external AXU interface with an infinite latency and/or step down logic, an off-chip AXU need not run at the same speed as the processing core, and may be implemented, for example, using a slower technology such as with an FPGA, thereby enabling, for example, an AXU to be developed and tested with a less expensive technology, and then implemented in a high speed technology such as an ASIC once the design has been verified with the FPGA. In addition, the design of an off-chip AXU may be an intermediate step in the design of an application-specific processing core, enabling the AXU design to be verified and refined prior to final integration into an application-specific processing core design.

In addition, an external AXU interface as implemented herein avoids the need to interface the AXU with the processing core through a memory or shared bus, where bus and resource contention might otherwise result. Furthermore, in chip stack implementations, an external AXU interface consistent with the invention may be used to interface an AXU disposed on one stacked die with a processor core disposed on another stacked die. By doing so, one stacked die may be devoted to multiple processor cores, while another stacked die may be devoted to multiple AXU's, eliminating the need for the AXU's to be fabricated using the same design rules or technology, and enabling the same processor core layer to be used with different AXU layers for different applications.

Various modifications may be made to the disclosed embodiments without departing from the spirit and scope of the invention. Therefore, the invention lies in the claims hereinafter appended.

What is claimed is:

1. A circuit arrangement, comprising:
   an integrated circuit chip;
   a processing core disposed on the chip and including an issue unit and a fixed point execution unit, wherein the issue unit is configured to issue instructions to the fixed point execution unit for execution thereby; and
   external auxiliary execution unit (AXU) interface logic disposed on the integrated circuit chip and coupled to the issue unit, wherein the external AXU interface logic is configured to receive instructions issued by the issue unit and communicate the instructions over an external AXU interface to an off-chip AXU for execution thereby, wherein the external AXU interface has an indeterminate latency, wherein the external AXU in response to communicating an instruction to the off-chip AXU, and to signal an error in response to not receiving the response, and wherein the external AXU interface logic is configured to convert the instruction to an appropriate format for the external AXU interface by one or more of packetizing the instruction, serializing the instruction or stepping down to a lower frequency.

2. The circuit arrangement of claim 1, wherein the integrated circuit chip is a first chip, the circuit arrangement further comprising a second chip upon which is disposed the off-chip AXU.

3. The circuit arrangement of claim 2, wherein the second chip is selected from the group consisting of a Field Programmable Gate Array (FPGA), an Application Specific Integrated Circuit (ASIC) and a stacked die.

4. The circuit arrangement of claim 1, wherein the external AXU interface logic includes step down logic configured to reduce a communication frequency of an external AXU interface relative to that of the processing core.

5. The circuit arrangement of claim 1, wherein the external AXU interface logic includes packetizer logic configured to communicate instructions received from the issue unit via packets.

6. The circuit arrangement of claim 1, wherein the external AXU interface logic includes a watchdog timer, and wherein the external AXU interface logic is configured to signal an error in response to not receiving the response prior to expiration of the watchdog timer.

7. The circuit arrangement of claim 1, wherein the external AXU interface logic is configured to update an architected state of the processing core in response to data received from the off-chip AXU over the external AXU interface.

8. A circuit arrangement, comprising:
   an integrated circuit chip;
   an off-chip auxiliary execution unit (AXU) disposed on the integrated circuit chip; and
   external AXU interface logic disposed on the integrated circuit chip and configured to couple the off-chip AXU to a processing core disposed on a different chip and including a fixed point execution unit and an issue unit configured to issue instructions to the fixed point execution unit for execution thereby, wherein the external AXU interface logic is configured to receive instructions issued by the issue unit over an external AXU interface and communicate the instructions to the off-chip AXU for execution thereby, wherein the external AXU interface has an indeterminate latency, wherein the external AXU interface logic includes a watchdog timer to prevent the off-chip AXU from hanging while waiting for a communication from the processing core, and wherein the external AXU interface logic is configured to convert the instruction from an appropriate format for the external AXU interface by one or more of depacketizing the instruction, deserializing the instruction or stepping up from a lower frequency.

9. The circuit arrangement of claim 8, wherein the integrated circuit chip comprises a Field Programmable Gate Array (FPGA).

10. The circuit arrangement of claim 8, wherein the integrated circuit chip comprises an Application Specific Integrated Circuit (ASIC).

11. The circuit arrangement of claim 8, wherein the integrated circuit chip comprises a stacked die.

12. The circuit arrangement of claim 8, wherein the external AXU interface logic is configured to update an architected state of the processing core in response to execution of an instruction by the off-chip AXU.

13. A method of executing instructions in a data processing system, the method comprising:
   in a processing core disposed on an integrated circuit chip, issuing first instructions to a fixed point execution unit disposed in the processing core using an issue unit disposed in the processing core and executing the first instructions with the fixed point execution unit; and
   issuing second instructions to an off-chip auxiliary execution unit (AXU) with the issue unit, including communicating the second instructions to the off-chip AXU over an external AXU interface using external AXU interface logic disposed on the integrated circuit chip;
   wherein the external AXU interface has an indeterminate latency, wherein the method further comprises waiting for a response from the off-chip AXU in response to communicating an instruction to the off-chip AXU, and signaling an error in response to not receiving the response, and wherein the external AXU interface logic is configured to convert the instruction to an appropriate format for the external AXU interface by one or more of packetizing the instruction, serializing the instruction or stepping down to a lower frequency.

14. The method of claim 13, wherein the integrated circuit chip is a first chip, and wherein the off-chip AXU is disposed on a second chip.

15. The method of claim 14, wherein the second chip is selected from the group consisting of a Field Programmable Gate Array (FPGA), an Application Specific Integrated Circuit (ASIC) and a stacked die.

16. The method of claim 13, further comprising, with step down logic disposed in the external AXU interface logic, reducing a communication frequency of the external AXU interface relative to that of the processing core.

17. The method of claim 13, further comprising, with packetizer logic disposed in the external AXU interface logic, communicating second instructions received from the issue unit via packets.

18. The method of claim 13, wherein the external AXU interface logic includes a watchdog timer, and wherein signaling the error is performed in response to the watchdog timer.

19. The method of claim 13, further comprising updating an architected state of the processing core in response to data received from the off-chip AXU over the external AXU interface.

* * * * *